(12) United States Patent
Laskawiec (10) Patent No.: US 11,520,602 B2
(45) Date of Patent: Dec. 6, 2022

(54) GENERATING CONFIGURATION CORRECTIONS FOR APPLICATIONS USING A CLASSIFIER MODEL

(71) Applicant: Red Hat, Inc., Raleigh, NC (US)

(72) Inventor: Sebastian Laskawiec, Lipniki (PL)

(73) Assignee: RED HAT, INC., Raleigh, NC (US)

(*) Notice: Subject to any disclaimer, the term of this patent is extended or adjusted under 35 U.S.C. 154(b) by 306 days.

(21) Appl. No.: 16/773,554

(22) Filed: Jan. 27, 2020

(65) Prior Publication Data
US 2021/0232411 A1  Jul. 29, 2021

(51) Int. Cl.
| | |
|---|---|
| G06F 9/445 | (2018.01) |
| G06F 9/54 | (2006.01) |
| G06F 11/22 | (2006.01) |
| G06F 11/30 | (2006.01) |
| G06F 11/32 | (2006.01) |
| G06F 9/50 | (2006.01) |

(52) U.S. Cl.
CPC ........ G06F 9/44505 (2013.01); G06F 9/5011 (2013.01); G06F 9/542 (2013.01); G06F 11/2289 (2013.01); G06F 11/3051 (2013.01); G06F 11/326 (2013.01)

(58) Field of Classification Search
CPC ............. G06F 11/2289; G06F 11/3051; G06F 11/326; G06F 11/302; G06F 11/3447; G06F 11/3419; G06F 9/44505; G06F 9/5011; G06F 9/5005; G06F 9/542
See application file for complete search history.

(56) References Cited

U.S. PATENT DOCUMENTS

| | | | |
|---|---|---|---|
| 8,447,851 B1 * | 5/2013 | Anderson | G06F 11/3495 709/223 |
| 9,256,424 B1 | 2/2016 | Kuchibhotla et al. | |
| 10,382,260 B1 | 8/2019 | Narang et al. | |
| 10,417,043 B1 | 9/2019 | Braverman et al. | |

(Continued)

FOREIGN PATENT DOCUMENTS

| | | |
|---|---|---|
| CN | 105933448 | 9/2018 |
| WO | 2017214271 | 12/2017 |

OTHER PUBLICATIONS

Federator.ai for OpenShift—ProphetStor Data Services Inc.; Federator. a9 AIOps Brings insight and foresight to modern IT operation; https://www.prophetstor.com/federator-ai/federator-ai-for-openshift/; Retrieved Oct. 1, 2019; pp. 1-5.

*Primary Examiner* — Raymond N Phan
(74) *Attorney, Agent, or Firm* — K&L Gates LLP (57) ABSTRACT

Methods and systems for detecting and responding to erroneous application configurations are presented. In one embodiment, a method is provided that includes receiving a configuration for an application and receiving execution metrics for the application. The configuration and the execution metrics may be compared to a knowledge base of reference configurations and reference execution metrics and a particular reference configuration may be identified from the knowledge base that corresponds to the configuration. The particular reference configuration may represent an erroneous configuration of the application that needs to be corrected. A configuration correction may then be identified based on the particular reference configuration.

19 Claims, 7 Drawing Sheets

(56) References Cited

U.S. PATENT DOCUMENTS

| | | | |
|---|---|---|---|
| 11,106,442 B1* | 8/2021 | Hsiao | H04L 67/22 |
| 2016/0080460 A1* | 3/2016 | Chung | H04L 12/6418 |
| | | | 709/224 |
| 2016/0301739 A1* | 10/2016 | Thompson | G06F 9/547 |
| 2017/0353991 A1* | 12/2017 | Tapia | H04W 24/04 |
| 2018/0349168 A1 | 12/2018 | Ahmed | |
| 2019/0235906 A1 | 8/2019 | Asawa et al. | |
| 2021/0149789 A1* | 5/2021 | Drori | G06F 16/2379 |

* cited by examiner

GENERATING CONFIGURATION CORRECTIONS FOR APPLICATIONS USING A CLASSIFIER MODEL

BACKGROUND

Applications may execute in computing environments, such as distributed computing environments. Applications that execute in such computing environments may support multiple configurations that adjust the operation of the applications based on one or more factors, including computing environment parameters and resource availability, which may be fixed or variable over time. Certain configurations may operate better under certain types of conditions, while other configurations may operate better under different types of conditions.

SUMMARY

The present disclosure presents new and innovative systems and methods for identifying and responding to erroneous configurations of applications. In one example, a method is provided that includes receiving (i) a configuration corresponding to an application and (ii) execution metrics corresponding to the application. The method may further include comparing the configuration and the execution metrics to a plurality of reference configurations and a plurality of reference execution metrics. The plurality of reference execution metrics may be associated with the plurality of reference configurations. A particular reference configuration may be identified from among the plurality of reference configurations. The particular reference configuration may correspond to the configuration and may represent an erroneous configuration to be corrected. A configuration correction may be identified based on the particular reference configuration.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

In certain instances, users may execute applications on computing environments (e.g., cloud computing environments) provided and configured by another entity (e.g., a cloud computing provider). For example, users may execute applications in a cloud computing environment implemented by a third party and configured and accessed according to the Red Hat® OpenShift® and/or Kubernetes® protocols. Conditions within such computing environments may vary, which may change the configurations required for applications to execute properly. It may therefore be unduly burdensome for users to configure applications properly and to update configurations in response to changes in the current conditions within the computing environments. Furthermore, applications that are incorrectly configured may perform poorly (e.g., may utilize excessive computing resources within the computing environment and/or may not properly execute to fulfill expected functions). For example, an application may be configured to execute with too many instances for its workload, and the additional instances may unnecessarily utilize computing resources (e.g., processing cores and/or memory capacity) within the computing environment (e.g., on a cluster or clusters executing the application).

Therefore, it may be beneficial to identify when an application executing within a computing environment has been incorrectly configured. One solution to address this issue is to compare a configuration and execution metrics for an application to multiple reference configurations and associated reference execution metrics for the application. The reference configurations and reference execution metrics may be stored within a knowledge base created by technicians or other individuals familiar with the computing environment in which the application is executing. A particular reference configuration may be identified from among the multiple reference configurations that most closely resembles the configuration and/or execution metrics of the application. In certain implementations, the comparison and identification of the particular reference configuration may be performed by a machine learning model, such as a classifier model. The particular reference configuration may represent an erroneous or incorrect configuration for which correction is needed to meet performance requirements. Therefore, based on the particular reference configuration, a configuration correction for the configuration of the application may be identified.

Figure 1:
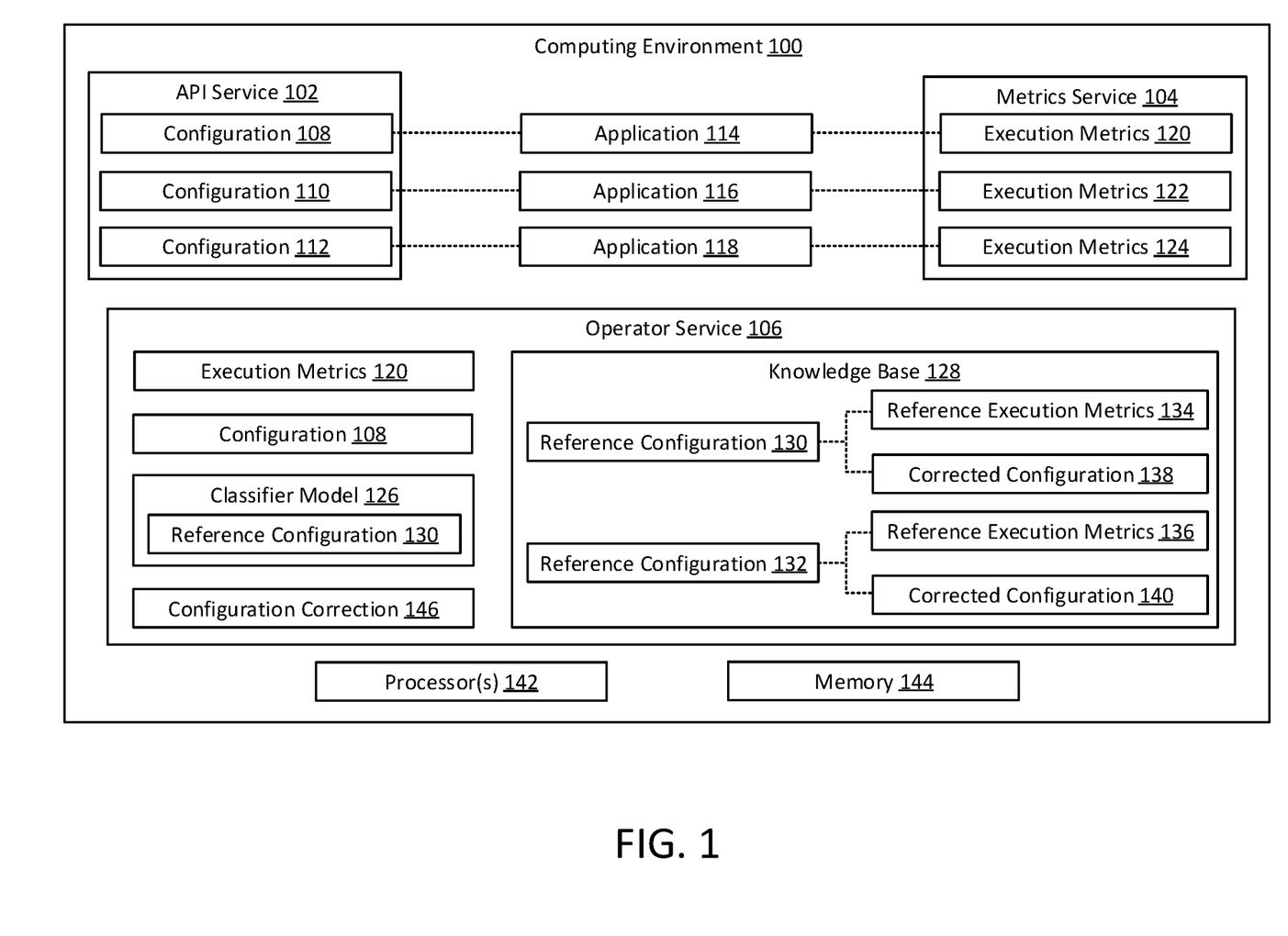
FIG. 1 illustrates a computing environment for generating configuration corrections according to an exemplary embodiment of the present disclosure.

FIG. 1 illustrates a computing environment 100 for generating configuration corrections according to an exemplary embodiment of the present disclosure. The computing environment 100 may be configured to execute applications 114, 116, 118. In particular, the computing environment includes processor(s) 142 and memory 144, which may be utilized to execute the applications 114, 116, 118. For example, one or more cores of the processor(s) 142 and particular amounts of the memory 144 may be allocated to each of the applications with 114, 116, 118 for execution. In certain implementations, the computing environment 100 is an exemplary implementation of all or part of a cloud computing environment (e.g., a cluster of a Kubernetes® cloud environment) or other distributed computing environment. The applications 114, 116, 118 may execute to perform different functions. For example, the application 114 may be executing as a data grid providing access and/or storage of data to other users, including users external to the computing environment 100. As another example, the application 116 may be executing to provide data synchronization between multiple computing clients. As a further example, the application 118 may execute to provide a send/receive buffer (e.g., for sending/receiving data) for the applications 114, 116.

Each of the applications 114, 116, 118 may have an associated configuration 108, 110, 112 and/or execution metrics 120, 122, 124. The configurations 108, 110, 112 may be applied by an application programming interface (API) service 102. The API service 102 may be configured to interface with the applications 114, 116, 118 in order to ensure that the applications 114, 116, 118 execute according to the configurations 108, 110, 112. Specifics regarding application configurations are discussed in greater detail below in connection with FIG. 2.

The execution metrics 120, 122, 124 may specify information regarding performance of each of the applications 114, 116, 118. The execution metrics 120, 122, 124 may be collected by a metrics service 104 of the computing environment 100. For example, the metrics service 104 may be configured to interface with the applications 114, 116, 118 and/or portions of the computing environment 100 (e.g., networking interfaces/services, resource utilization monitors) to determine the operating conditions of the applications 114, 116, 118 and to store the operating conditions (e.g., operating conditions over time) as execution metrics 120, 122, 124. The execution metrics 120, 122, 124 may be collected on a regular basis, such as, e.g., every second, every 15 seconds, every minute, every five minutes, every 10 minutes. The execution metrics 120, 122, 124 may provide average performance measures over a period of time, such as a rolling period of time (e.g., the last 10 seconds, the last minute, the last 10 minutes) or for a period of time with a fixed starting point (e.g., since execution of the application 114, 116, 118 began). In certain implementations, the execution metrics 120, 122, 124 may be collected as a weighted moving average (e.g., where earlier samples are assigned a lower weight than later samples). The execution metrics 120, 122, 124 may differ depending on the type of application 114, 116, 118. For example, for an application 114 executing to provide a data grid, the execution metrics 120 may specify a request throughput reflecting an average rate at which requests are received for the data grid, a request latency reflecting average response time to the received requests, and an average startup time for instances of the application 114. As another example, for an application 116 providing data synchronization, the execution metrics 122 may specify an amount of data transferred, times at which data is transferred, and data transfer latency indicating an average time it takes for data updated on one computing client to be updated on another computing client. As a further example, for applications 118 executing to provide a send/receive buffer, the execution metrics may include one or more of a request throughput, request latency, and average buffer utilization indicating an average amount of buffer space utilized during execution. Additionally or alternatively, the execution metrics 120, 122, 124 may indicate measures of resource utilization by the applications 114, 116, 118. For example, the execution metrics 120, 122, 124 may indicate an amount of processing power (e.g., number of processing cores, an overall processor utilization) utilized, an amount of memory utilized, an amount of bandwidth utilized, and an amount of storage space utilized. In light of the present disclosure, additional or alternative execution metrics to the discussed above may be apparent to those skilled in the art. All such execution metrics are presently contemplated and considered within the scope of the present disclosure.

The operator service 106 may be configured to analyze configurations of applications executing within the computing environment 100 and to generate corrections for the configurations. For example, as depicted, the operator service 106 may receive the execution metrics 120 and the configuration 108 of the application 114 and may generate a configuration correction 146 for the application 114. The operator service 106 includes a classifier model 126 and a knowledge base 128. The knowledge base 128 stores reference configurations 130, 132 associated with reference execution metrics 134, 136 and corrected configurations 138, 140. The reference configurations 130, 132 may store erroneous configurations previously identified as configurations that should be corrected or otherwise updated in order to ensure proper operation of applications 114, 116, 118. For example, the reference configurations 130, 132 may be added to knowledge base 128 after determining (e.g., after a technician of the computing environment 100 determines) that the reference configurations 130, 132 are erroneous. The erroneous configurations may require correction in order to, e.g., reduce resource utilization by the application, improve response time of the application, and properly perform the functions of the applications and avoid crashing or otherwise interrupting execution of the application and/or computing environment 100 (e.g., a virtual machine). The reference execution metrics 134, 136 may reflect execution metrics of applications when configured according to the reference configurations 130, 132. Accordingly, the reference execution metrics 134, 136 may include types of metrics similar to those discussed above in connection with the execution metrics 120, 122, 124. The corrected configurations 138, 140 may indicate configurations that were applied to the applications in order to reference configurations 130, 132. For example, the corrected configurations 138, 140 may change one or more of the configuration parameters in order to correct one or more of the above-discussed problems that may occur with applications executing according to the reference configurations 130, 132. Applications executing to perform different functions may have different types of configurations and/or configuration parameters. Accordingly, the applications 114, 116, 118 may correspond to particular reference configurations 130, 132 within the knowledge base 128. For example, both of the reference configurations 130, 132 may be reference configurations for the application 114, and the knowledge base 128 may store additional reference configurations relating to the applications 116, 118 (e.g., in the same or a different database/database table of the knowledge base 128). Similarly, each of the reference configurations 130, 132 may represent configurations with different problems and/or errors. For example, the reference configuration 130 may represent a configuration that utilizes too many computing resources, while the reference configuration 132 may represent a configuration that does not meet one or more performance requirements (e.g., that has a response latency that is too high). Accordingly, the reference execution metrics 134, 136 may similarly differ (e.g., differ in problematic/disadvantageous metrics) and the corrected configurations 138, 140 may present different types of changes to the reference configurations 130, 132.

The classifier model 126 may be configured to analyze the reference configurations 130, 132 corresponding to the application 114. In particular, the classifier model 126 may compare the configuration 108 and the execution metrics 120 to the reference configurations 130, 132 and reference execution metrics 134, 136 to identify a corresponding reference configuration. For example, the classifier model 126 may determine that the reference configuration 130 corresponds to the configuration 108 and the execution metrics 120. To identify the corresponding reference configuration, the classifier model 126 may identify a reference configuration 130, 132 that is similar to the configuration 108 and that has reference execution metrics 134, 136 similar to the execution metrics 120. In certain implementations, the classifier model 126 may be implemented as a machine learning model configured to classify received execution metrics 120 and configurations 108 to identify the most similar combination of reference configuration and reference execution metrics. In particular, the classifier model 126 may be implemented as one or more of a decision tree classifier, logistic regression classifier, nearest neighbor classifier, neural network classifier, support vector machine, and a naive Bayes classifier. The classifier model 126 may be trained based on at least a subset of the reference configurations 130, 132 within the knowledge base 128. For example, the knowledge base 128 may also include one or more training sets of configurations and execution metrics that may be used to train the classifier model 126. For example, the training sets may specify a corresponding reference configuration 130, 132 and the classifier model 126 may analyze the training sets to predict the corresponding reference configuration 130, 132. Parameters of the classifier model 126 may be updated based on whether the classifier model 126 correctly classified the training sets. In particular, the parameters may include weights (e.g., priorities) for different features and combinations of features (e.g., information included within the configurations and execution metrics) and updating the classifier model 126 may include updating one or more of the features analyzed and the weights assigned to different features and/or combinations of features. Furthermore, although discussed as a classifier model, in other implementations, the classifier model 126 may be implemented as other types of machine learning models (e.g., supervised learning models, unsupervised learning models).

In certain implementations, the operator service 106 may include different classifier models 126 for one or more of the applications 114, 116, 118. For example, in certain implementations, the operator service 106 may have a separate classifier model 126 for each application 114, 116, 118. Additionally or alternatively, the computing environment 100 may have different operator services 106 with different classifier models 126 and different knowledge bases 128 for different types of applications 114, 116, 118.

Based on the reference configuration 130 identified by the classifier model 126, the operator service 106 may generate a configuration correction 146. For example, the configuration correction 146 may indicate the corrected configuration 138 corresponding to the reference configuration 130 identified by the classifier model 126. The configuration correction 146 may indicate an updated configuration for the application 114 (e.g., a complete configuration, a partial configuration). Additionally or alternatively, the configuration correction 146 may indicate particular changes that should be made to the configuration 108 of the application 114. Further specifics regarding the configuration correction 146 are discussed below in connection with FIGS. 3A, 3B, and 4.

The computing environment 100 may be implemented by one or more computing devices, such as server computers, laptop computers, personal computers, virtual machines, smartphones, tablets, wearable computing devices, or any other suitable computing device. Additionally, the processor(s) 142 and memory 144 may be configured to implement one or more operational features of the computing environment 100. For example, memory 144 may store instructions which when executed by one or more of the processor(s) 142, may cause the processor(s) 142 to execute one or more operational features of the computing environment 100.

Figure 2:
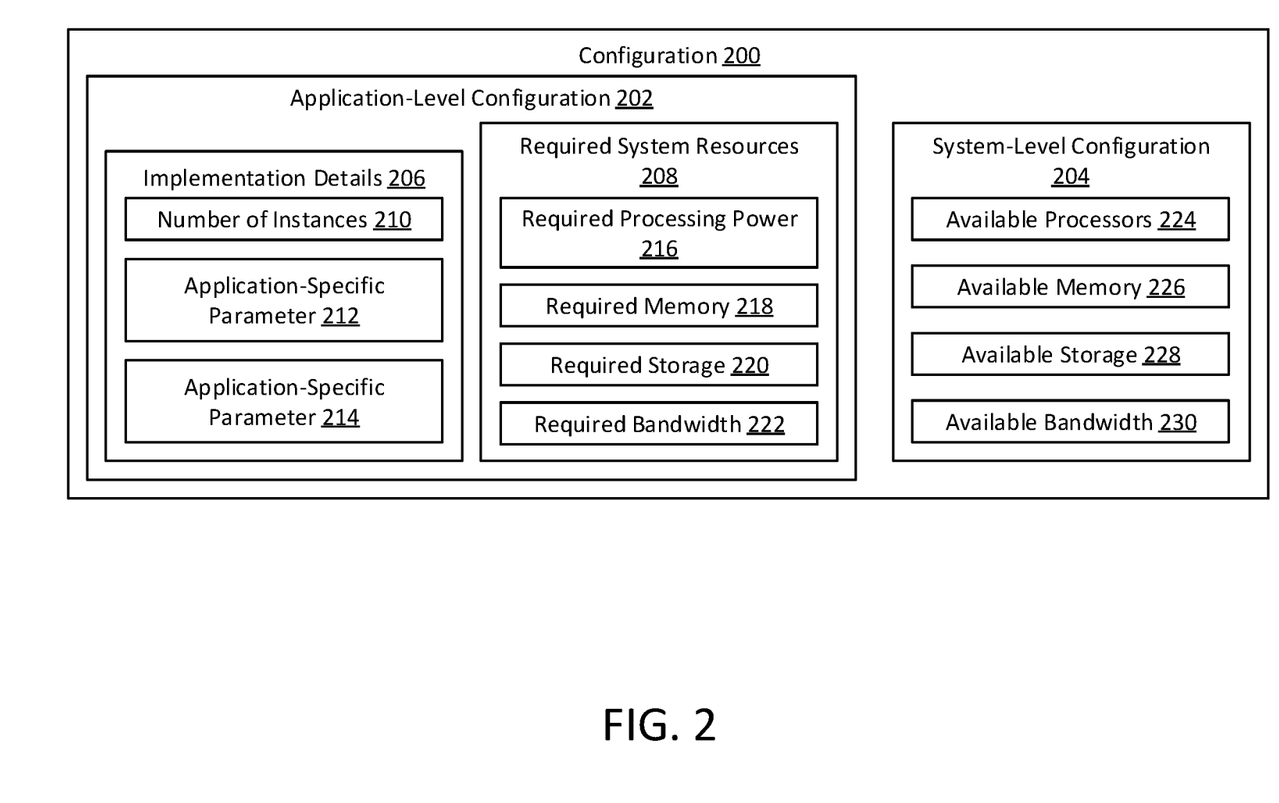
FIG. 2 illustrates a configuration according to an exemplary embodiment of the present disclosure.

FIG. 2 illustrates a configuration 200 according to an exemplary embodiment of the present disclosure. The configuration 200 may be an exemplary implementation of configurations used by the computing environment 100 and/or the operator service 106. For example, the configuration 200 may be an exemplary implementation of the configurations 108, 110, 112 and/or the reference configurations 130, 132. The configuration 200 includes an application-level configuration 202 and a system-level configuration 204. In certain implementations, the configuration 200 may be implemented as a data structure storing the application-level configuration 202 and/or the system-level configuration 204. For example, the configuration 200 may be stored as one or more of an extended markup language (XML) file, a Kubernetes® ConfigMap data structure, a YAML file, and/or a JavaScript Object Notation (JSON) file.

The application-level configuration 202 may specify particular options and/or parameters specific to particular implementations of applications 114, 116, 118 (e.g., may specify how the application 114, 116, 118 executes within the computing environment 100). For example, the application-level configuration 202 may include implementation details 206 that specify particular implementation options and/or parameters for the applications 114, 16, 118. As a specific example, the implementation details 206 may include a number of instances 210 specifying a number of instances of the application 114, 116, 118 should execute within the computing environment 100. For example, certain applications 114, 116, 118 may be capable of executing as one or more instances executing in parallel (e.g., instances executing within separate containers and/or virtual machines of the computing environment 100), and the number of instances 210 may specify one or more of a required number of instances, minimum number of instances, and/or maximum number of instances for the application 114, 116, 118. The implementation details 206 may also include one or more application-specific parameters 212, 214. The application specific parameters 212, 214 may specify one or more parameters or options that configure how the particular application 114, 116, 118 executes within the computing environment 100. The specific types of application-specific parameters 212, 214 may differ depending on the specific type of application. For example, for an application 114 executing to provide a data grid, the application-specific parameters 212, 214 may include one or more of a number of initial members expected when detecting members of the data grid, a request timeout period specifying the maximum number of times in instance of the application 114 will wait for a response when detecting members of the data grid, a member discovery protocol specifying the type of communication protocol members of the data grid utilized to communicate, a storage configuration specifying a type of formatting and/or storage protocol used to store data within the data grid, a duplication protocol specifying whether and how data is duplicated across multiple members of the data grid, and/or a maximum size of files and/or partial files stored on the data grid. As another example, for an application 116 providing data synchronization, the application-specific parameters 212, 214 may specify one or more of an update frequency uploading and/or downloading synchronized data, a maximum data size for files or partial files synchronized between clients, a preferred data transfer speed, a data storage format, and/or a maximum number of clients per synchronization operation. As a still further example, for an application 118 executing to provide a send/receive buffer, the application-specific parameters 212, 214 may specify one or more of a number of buffers to be implemented by each instance of the application 118, a storage capacity for each buffer, a maximum or minimum payload size for the buffers, and/or an uptime for instances of the application 118.

Additionally or alternatively, the application-level configuration 202 may identify required system resources 208 indicating amounts of resources needed to execute the application 114, 16, 118 and/or to execute instances of the application 114, 116, 118 within the computing environment 100. For example, the required system resources 208 may specify a required processing power 216, (e.g., a minimum number of processing cores, maximum number of processing cores, a particular type of processing core such as a graphical processing core or a neural network core) and/or required memory 218 (e.g., a minimum memory capacity required, a maximum memory capacity required, a type of memory required). The required system resources 208 may additionally or alternatively include required storage 220 (e.g., a minimum amount of storage space required, a maximum amount of storage space required, a particular type of storage space required, a storage data transfer speed required) and/or a required bandwidth 222 (e.g., a minimum of network bandwidth required, a maximum amount of network bandwidth required, a particular network communication interface required). The required resources 208 may be specified for the application 114, 116, 118 overall and/or may specify the resources required for individual instances of the application 114, 116, 118.

The system-level configuration 204 may specify an amount of one or more system resources available for execution of applications 114, 116, 118. For example, the system-level configuration 204 may specify the amount of one or more system resources available within the computing environment 100 (e.g., available within the cluster in which the application 114, 116, 118 is executing). As a specific example, the system-level configuration 204 may specify one or more of available processors 224 (e.g., available processing cores), available memory 226 (e.g., available memory capacity and/or available memory speed), available storage 228 (e.g., available storage capacity and/or available storage transfer speed), and/or available bandwidth 230 (e.g., available bandwidth transfer capacity). In certain implementations, the system-level configuration 204 may specify a total amount of system resources available. Additionally or alternatively, the system-level configuration 204 may specify an amount of system resources that are available and are not allocated for use with other system functions (e.g., other applications). For example, one or more applications may reserve access to particular system resources (e.g., particular processing cores and/or particular capacities of memory), but may not be currently using the reserve computing resources to execute. In such instances, the system-level configuration 204 may omit such reserved computing resources from indications of the available system resources.

It should be understood that certain implementations of the configuration 200 may differ from those depicted in FIG. 2. For example, certain implementations of the configuration 200 may lack one or more of the implementation details 206, the required system resources, and the system level configuration 204. Additionally or alternatively, certain implementations of the required system resources 208, the implementation details 206, and/or the system-level configuration 204 may omit one or more of the depicted pieces of information and/or may include additional pieces of information. For example, the required system resources 208 and/or the system-level configuration 204 may include information regarding additional types of system resources to those depicted and/or may exclude information regarding one or more of the depicted types of system resources.

Figure 3A:
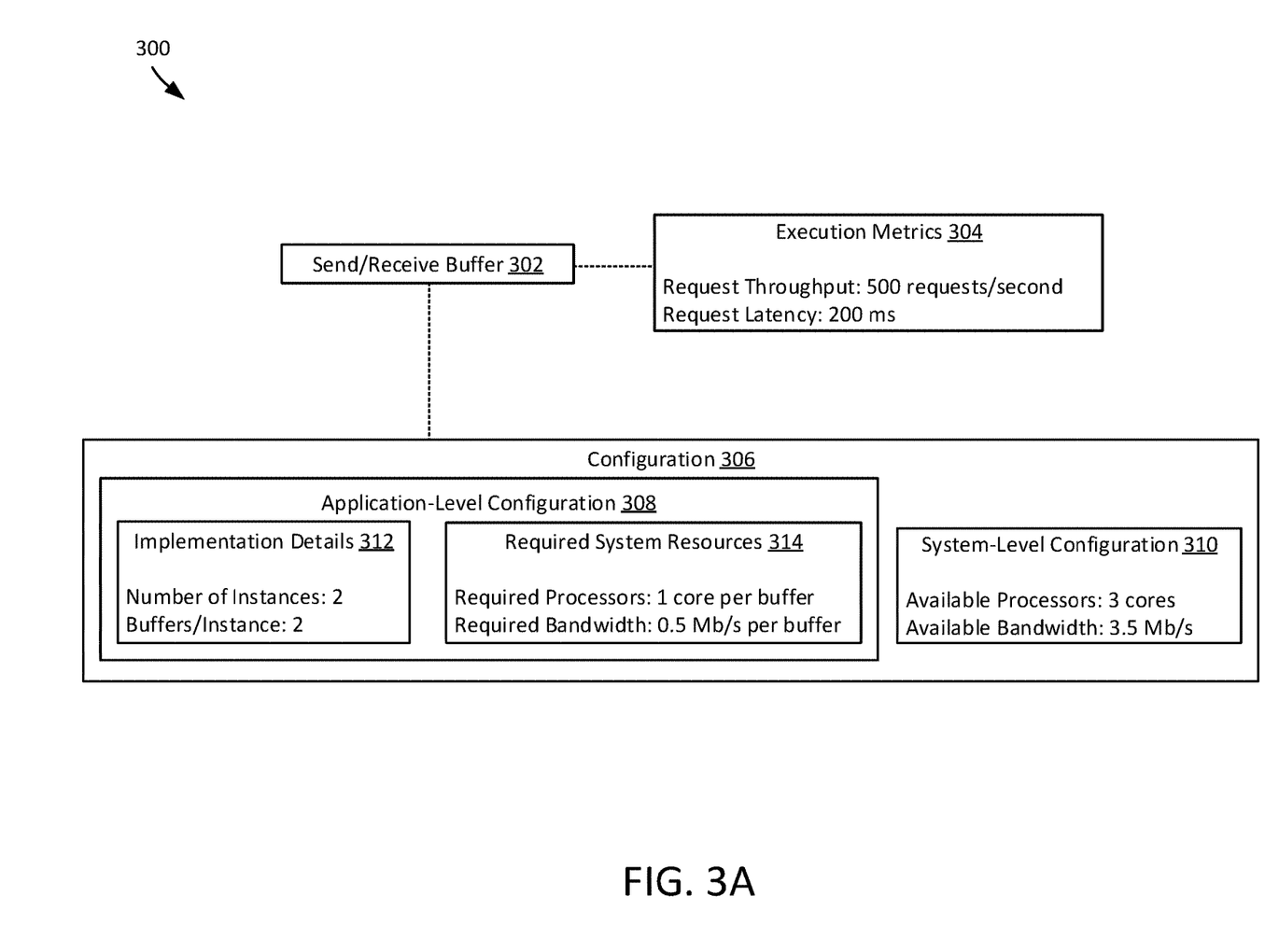
FIGS. 3A-3B illustrate a configuration correction generation procedure according to an exemplary embodiment of the present disclosure.
Figure 3B:
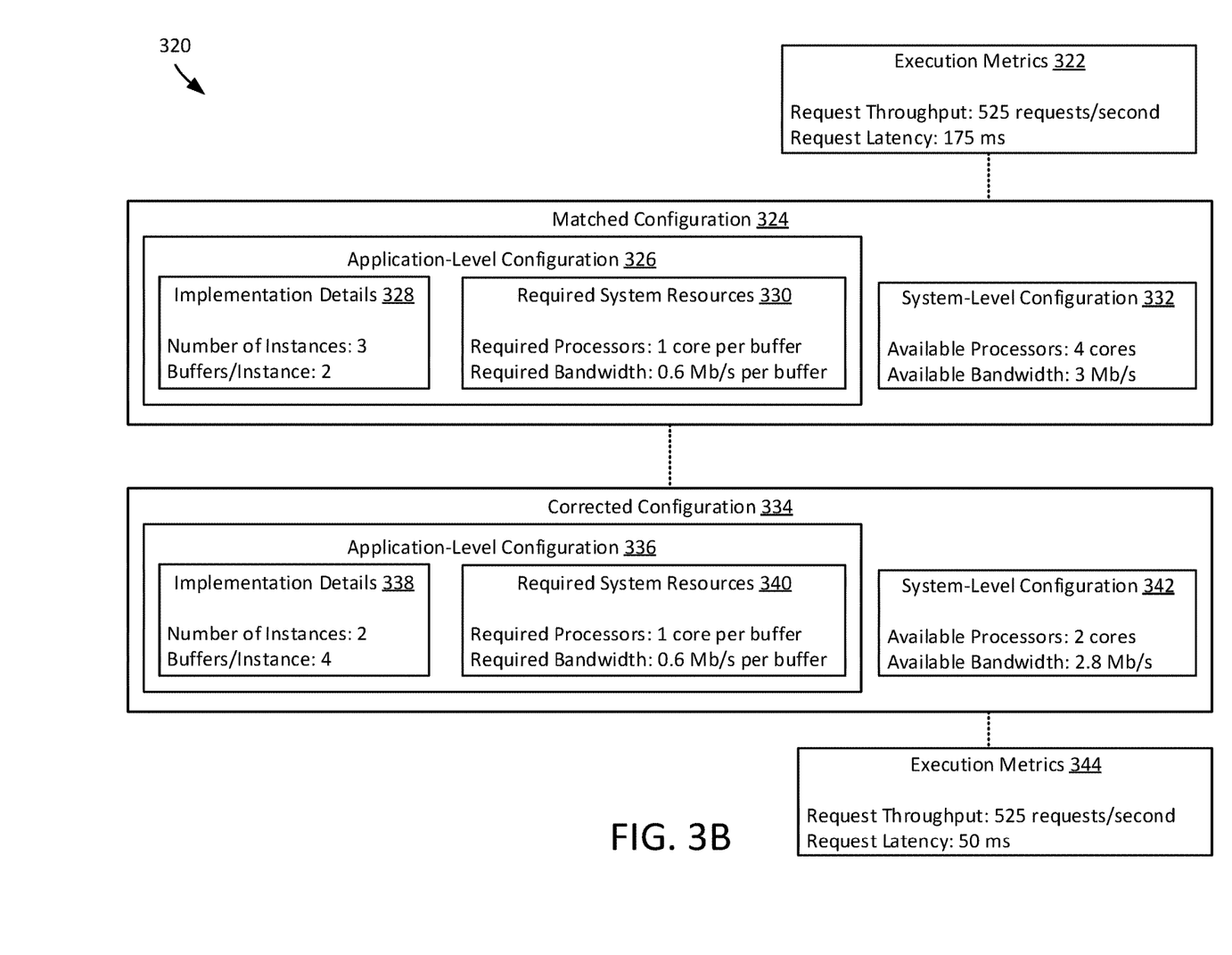

FIGS. 3A-3B illustrate a configuration correction generation procedure according to an exemplary embodiment of the present disclosure. The configuration correction generation procedure is illustrated as two system states 300, 320 respectively depicted in FIGS. 3A and 3B. The system states 300, 320 may be performed to identify an erroneous reference configuration that is similar to a configuration of a send/receive buffer application that is executing in a computing environment. Based on the erroneous reference configuration, a corrected configuration may be identified and the configuration of the send/receive buffer may be updated based on the corrected configuration.

In particular, the configuration correction generation procedure may be performed to update the configuration 306 of a send/receive buffer 302. The send/receive buffer 302 may be an application executing within a computing environment 100. The send/receive buffer 302 may be communicatively coupled to an endpoint (e.g., an endpoint of another application, such as an application implementing an application programming interface (API) call). In particular, the send/receive buffer 302 may be configured to receive and store data payloads intended for the application (e.g., API requests) and to transmit data payloads on behalf of the application (e.g., API responses).

As depicted, the configuration 306 includes an application-level configuration 308 and a system-level configuration 310. The application-level configuration 308 includes implementation details 312 specifying that there are two instances of the file buffer 302 executing and that each instance is implementing two buffers (e.g., is capable of transmitting/receiving two data payloads at the same time). For example, the number of instances and number of send/receive buffers per instance may be controlled to provide a desired number of send/receive buffers (e.g., sufficient send/receive buffers to receive and process requests with minimum latency). In particular, in certain instances (e.g., where available processing cores are fragmented among different processors 142) it may be advantageous to execute more instances of the send/receive buffer 302 spread across multiple processors 142 and/or processing cores. In further instances (e.g., where many processing cores are available on the same processor 142) it may be advantageous to execute more buffers per instance of the send/receive buffer 302 (e.g., in order to reduce container or VM-based computing overhead for multiple instances executing in multiple containers and/or VMs).

The application-level configuration 308 also includes required system resources 314 specifying that each buffer requires one processing core and 0.5 Mb/s of bandwidth in order to function properly. The system-level configuration 310 specifies that there are three available processing cores and 3.5 Mb/s of available bandwidth within the computing environment 100.

The send/receive buffer 302 also includes associated execution metrics 304 (e.g., execution metrics collected by the metrics service 104 during execution of the send/receive buffer 302 within the computing environment 100). The execution metrics 304 may specify operating conditions and performance of the send/receive buffer 302. For example, as depicted, the execution metrics 304 specify that the send/receive buffer 302 (e.g., all instances and buffers combined) receive 500 requests per second and have an average request latency of 200 ms. In general, it may be preferable to process requests with latencies of 50 ms or less. For example, other applications may transmit data to and receive data from the send/receive buffer, so longer request latencies can delay processing not only by the send/receive buffer 302, but also by processing the other applications.

Therefore, to resolve such issues, an operator service 106 may receive the configuration 306 and the execution metrics 304 in order to correct the configuration 306 and reduce the request latency. For example, a user implementing and/or executing the send/receive buffer 302 may provide the configuration 306 and the execution metrics 304 to an operator service 106 executing within the same computing environment 100 as the send/receive buffer 302. In certain implementations, the configuration 306 and the execution metrics 304 may be received by an operator service 106 associated with the send/receive buffer 302 (e.g., an operator service 106 configured to update the configurations of applications executing to implement send/receive buffers 302). The operator service 106 may compare the configuration 306 and the execution metrics 304 to a knowledge base 128 containing multiple reference configurations 130, 132 and associated reference execution metrics 134, 136. For example, the operator service 106 may include a classifier model 126 configured to (e.g., trained to) compare configurations 306 and execution metrics 304 of send/receive buffers 302 to knowledge bases 128 containing reference configurations 130, 132 and reference execution metrics 134, 136 originating from other implementations of send/receive buffers.

Based on the comparison, the classifier model 126 may identify a corresponding reference configuration within the knowledge base 128. For example, the corresponding reference configuration may be similar to the configuration 306 and/or may have corresponding reference execution metrics similar to the execution metrics 304. In system state 320, the matched configuration 324 may be identified as the corresponding reference configuration for the configuration 306. In particular, the matched configuration 324 includes an application-level configuration 326 and a system-level configuration 332 similar to the application-level configuration 308 and system-level configuration 310. For example, the implementation details 328 of the application-level configuration 326 include a similar number of instances (three) as the implementation details 312 (two) and the same number of buffers per instance (two). Further, the required system resources 330 include the same number of required as the required system resources 314 and a similar amount of wired bandwidth per buffer (0.6 Mb/s) as the required system resources 314 (0.5 Mb/s). Additionally, the system-level configuration 332 includes similar number of available processors (four cores) as the system-level configuration 310 (three cores) and a similar amount of bandwidth (3 Mb/s) as the system-level configuration 310 (3.5 Mb/s). The matched configuration 324 also includes associated execution metrics 322 that are similar to the execution metrics 304 of the send/receive buffer 302. In particular, the execution metrics 322 indicate a request throughput of 525 requests per second and a request latency of 175 ms, while the execution metrics 304 indicate the send/receive buffer 302 has a request throughput of 500 requests per second and a request latency of 200 ms. The classifier model 126 may identify the matched configuration 324 as corresponding to the configuration 306 by classifying the configuration 306 as most closely resembling the matched configuration 324. For example, the configuration 306 may be classified based on one or more characteristics of the implementation details 312, the required system resources 314, and the system-level configuration 310 and may additionally or alternatively be classified based on the execution metrics 304. In particular, as discussed above, the execution metrics 304 and the configuration 306 may, in certain implementations, include additional parameters and/or items of information. In such instances, the depicted parameters and/or items of information may indicate all or part of the characteristics utilized to classify the configuration 306.

The matched configuration 324 corresponds to a corrected configuration 334. The corrected configuration 334 includes an application-level configuration 336 and a system-level configuration 342. The implementation details 338 of the application-level configuration 336 indicate that two instances of the send/receive buffer are executed and that each instance includes four buffers. The required system resources 340 of the application-level configuration 336 are identical to the required system resources 330 (e.g., because the performance requirements for the send/receive buffer associated with the matched configuration 324 did not change). Additionally, the system-level configuration 342 indicates two remaining available processing cores and 2.8 Mb/s of remaining bandwidth. The corrected configuration 334 also includes associated execution metrics 344 indicating that, under the same request throughput of 525 requests per second as the execution metrics 322, the corrected configuration 334 resulted in a request latency of 50 ms. In particular, the corrected configuration 334 resulted in two instances of the send/receive buffer implementing a total of eight buffers compared to the total of six buffers implemented according to the matched configuration 324. The additional buffers, along with the reduced number of total instances, may help reduce the request latency from 175 ms to 50 ms.

The operator service 106 may then correct the configuration 306 based on the corrected configuration 334. For example, the operator service 106 may identify a configuration correction 146 that updates all or part of the configuration 306 based on corresponding portions of the corrected configuration 334. For example, the operator service 106 may update the implementation details 312 to be the same as the implementation details 338 (e.g., to implement two instances of the send/receive buffer 302, each instance including four buffers).

In certain instances, system states 300, 320 may be utilized as part of updating the configuration of another application. For example, the send/receive buffer 302 may receive and transmit data payloads on behalf of another application and the configuration 306 of the send/receive buffer 302 may be updated as a part of updating the configuration of the other application. As a specific example, the send/receive buffer 302 may receive and transmit data payloads on behalf of a data grid member 402 (discussed below in connection with FIG. 4) and the configuration 306 may be updated in connection with updating the configuration 404 of the data grid member 402.

It should be understood that the system states 300, 320 as depicted merely represent one embodiment of a configuration operation to update the configuration of the send/receive buffer 302. For example, additional or alternative implementations may include configurations having more, fewer, and/or different parameters and/or items of information. As another example, comparisons (e.g., comparisons performed by the classifier model 126) may consider additional or alternative characteristics of the configuration 306 and execution metrics 304. Similar techniques may be utilized to process applications of different types (e.g., applications other than send/receive buffers 302).

Figure 4:
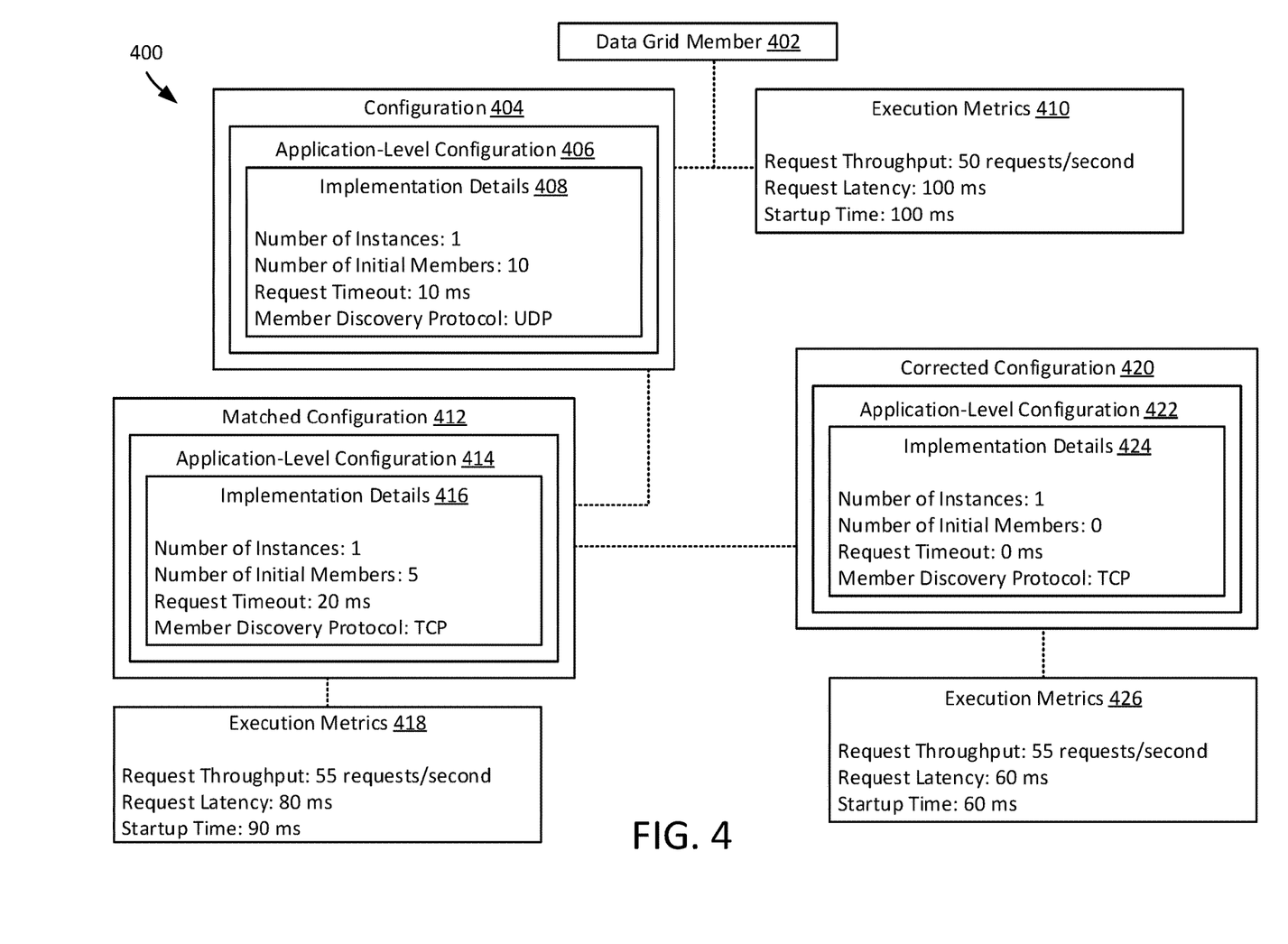
FIG. 4 illustrates an operation to generate a configuration correction according to an exemplary embodiment of the present disclosure.

FIG. 4 illustrates an operation 400 to generate a configuration correction 146 according to an exemplary embodiment of the present disclosure. The operation 400 may be performed to identify an erroneous reference configuration that is similar to a configuration of an application implementing a data grid member that is executing in a computing environment. Based on the erroneous reference configuration, a corrected configuration may be identified in the configuration of the data grid member and be updated based on the corrected configuration.

In particular, the operation 400 may be performed to update the configuration 404 of the data grid member 402. The data grid member 402 may be a member of a data grid configured to store data in a distributed fashion across multiple members. All or part of the members of the data grid may be implemented as applications executing within computing environments (e.g., the same computing environment, different computing environments). Accordingly, in certain implementations, the data grid may in practice function as a distributed database, and the members may store duplicate and/or overlap copies of the data included within the data grid. Upon initial execution of the data grid member 402 and/or at regular intervals thereafter, the data grid member 402 may be configured to identify and discover other members of the data grid. To do so, the data grid member 402 may communicate with and request information from other members according to a particular protocol (e.g., the JGroups protocol). The protocol may be configurable to, e.g., adjust the communication interface used to communicate, select an initial number of expected members of the data group, and adjust a timeout period after which the data grid member 402 will stop searching for other members of the data grid.

The configuration 404 of the data grid member 402 includes an application-level configuration 406 that indicates that one instance of the data grid is executing. For example, the data grid member 402 may be the only member of the data grid (e.g., because additional members are not necessary to process data requests). However, the implementation details 408 indicate that the expected number of initial members is 10, that the data grid member 402 will wait 10 ms before member discovery requests will timeout, and that the member discovery protocol is the user datagram protocol (UDP). Although the implementation details 408 specify that there is only a single instance of the data grid member 402, upon instantiation and/or at regular intervals, the data grid member 402 may search for other members of the data grid based on the implementation details 408 (e.g., the number of initial members being greater than zero and the request timeout to being longer than 0 ms). The data grid member's 402 searching for other members may increase the overall startup time of the data grid member 402 and may also increase the request latency (e.g., as the data grid member 402 periodically searches for other data grid members that do not exist). These delays can be seen in the execution metrics 410 associated with the data grid member 402. In particular, the execution metrics 410 indicate that the data grid member 402 is receiving 50 requests per second, but has a request latency of 100 ms, which may exceed a performance requirement of the data grid member 402. Additionally, because the data grid member 402 is searching for other members of the data grid, the execution metrics 410 indicates a startup time of 100 ms.

Therefore, an operator service 106 may receive the configuration 404 and the execution metrics 410 in order to correctly configuration 404 and used the request latency in the startup time of the data grid member 402. For example, a user implementing and/or executing the data grid member 402 may provide the configuration 404 in the execution metrics 410 to an operator service 106 executing within the same computing environment 100 as the data grid member 402 (e.g., and operator service 106 configured to update the configurations of applications executing to implement data grid members 402). The operator service 106 may compare the configuration 404 in the execution metrics 102 a knowledge base 128 containing reference configurations 130, 132 and reference execution metrics 134, 136 originating from other implementations of data grid members. In particular, the operator service 106 may include a classifier model 126 configured to perform such comparisons.

Based on the comparison, the classifier model 126 may identify a corresponding reference configuration within the knowledge base 128 (e.g., a reference configuration similar to the configuration 404 and/or having associated reference execution metrics similar to the execution metrics 410). The matched configuration 412 may be identified as the corresponding reference configuration for the configuration 404. For example, the matched configuration 412 may be identified as the corresponding reference configuration because the matched configuration 412 includes an application-level configuration 414 similar to the application-level configuration 406. The implementation details 416 of the application level configuration 414 similarly indicates a single instance of a data grid is executing, and that the data grid searches for five initial members and has a request timeout period of 20 ms. The implementation details 416 also specify that the data grid member will communicate according to the Transmission Control Protocol (TCP). Also, the execution metrics 418 associated with the matched configuration 412 indicate a similar request throughput of 55 requests per second, a similar request latency of 80 ms and a similar startup time of 90 ms. As explained further above, the matched configuration 412 may be identified by classifying the configuration 404 based on one or more characteristics. For example, the configuration 404 may be classified one or more of the similar configuration parameters and/or the similar execution metrics discussed above. Additionally or alternatively, the classifier model 126 may ignore (or minimally weight) other characteristics. For example, the different member discovery protocols may be of relatively low importance because, ultimately, the data grid member 402 does not need to transmit discovery messages, as there are no other data grid members to discover. Accordingly, when classifying the configuration 404, the classifier model 126 may apply a low weight to the member discovery protocol parameter of the implementation details 408.

The matched configuration 412 includes a corresponding corrected configuration 420 that has an application-level configuration 422. The implementation details 424 of the application-level configuration 422 indicate that one instance of the data grid member is executing, but that the expected number of initial members is zero and that the request timeout period is 0 ms. The implementation details 424 further specify that the member discovery protocol is TCP. Execution metrics 426 corresponding to the corrected configuration 420 indicate that, under the same 55 requests per second throughput, the corrected configuration 420 resulted in a request latency of 60 ms and a startup time of 60 ms. Accordingly, the corrected configuration 420 resulted in an improved request latency and startup time as compared to the matched configuration 412.

The operator service 106 may correct (e.g., update) the configuration 404 based on the corrected configuration 420. For example, the operator service 106 may identify a configuration correction 146 that updates all or part of the configuration 404 that differs from the corrected configuration 420. In particular, the configuration correction 146 may be identified to change the portions of the implementation details 408 that differ from the implementation details 424. For example, the operator service 106 may correct the implementations details by changing the number of initial members to zero and by changing the request timeout period to 0 ms.

As depicted, the configuration 404, the matched configuration 412, and the corrected configuration 420 only include application level configurations 406, 414, 422. Additionally, the application-level configurations 406, 414, 422 only include implementation details 408, 416, 424. It should be understood that, in practice, the configurations 404, 412, 420 may include additional information, such as a system-level configuration, required system resources, and/or additional parameters within the implementation details 408, 416, 424.

Figure 5:
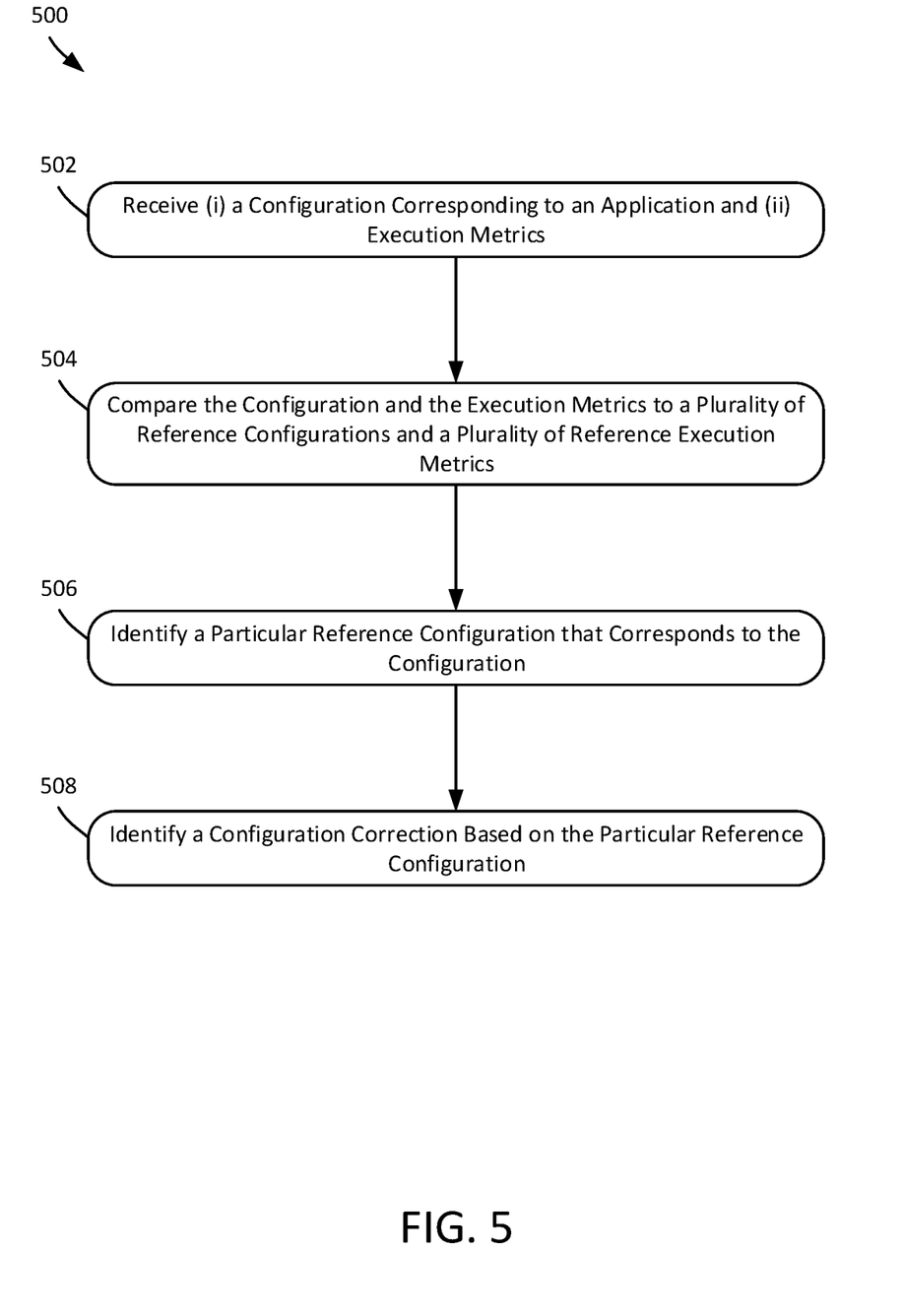
FIG. 5 illustrates a method for generating configuration corrections according to an exemplary embodiment of the present disclosure.

FIG. 5 illustrates a method 500 according to an exemplary embodiment of the present disclosure. The method 500 may be implemented on a computer system, such as the computing environment 100. For example, the method 500 may be implemented at least in party by the operator service 106. The method 500 may also be implemented by a set of instructions stored on a computer-readable medium that, when executed by a processor, cause the processor to perform the method 500. For example, all or part of the method 500 may be implemented by the processor(s) 142 and the memory 144. Although the examples below are described with reference to the flowchart illustrated in FIG. 5, many other method of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving (i) a configuration corresponding to an application and (ii) execution metrics for the application (block 502). For example, the operator service 106 may receive a configuration 108 of an application 114 and execution metrics 120 for the application 114. The operator service 106 may be part of a computing environment 100 and the application 114 may be executing within the computing environment 100. For example, the application 114 may be executing within the computing environment to service calls to an API. The operator service 106 may receive the configuration 108 and the execution metrics from the computing environment 100.

The configuration and the execution may be compared to a plurality of reference configurations and a plurality of reference execution metrics (block 504). For example, the operator service 106 may compare the configuration 108 and the execution metrics 120 to a plurality of reference configurations 130, 132 and a plurality of reference execution metrics 134, 136 associated with the plurality of reference configurations 130, 132. In particular, the operator service 106 may include a knowledge base 128 storing the reference configurations 130, 132 and the reference execution metrics 134, 136. The comparison may be performed by a machine learning model, such as the classifier model 126. For example, the classifier model 126 may be trained to classify the configuration 108 and the execution metrics 120 and one or more categories defined by the reference configurations 130, 132 and to identify the most similar combination of reference configuration and reference execution metrics. A particular reference configuration may be identified that corresponds to the configuration (block 506). For example, the classifier model 126 may identify a particular reference configuration 130 that corresponds to the configuration 108. In particular, the classifier model 126 may identify the reference configuration 130 which, in combination with corresponding reference execution metrics 134, most closely resembles the execution metrics 120 and the configuration 108. In an example where the application 114 is executing to provide responses to API calls, the configuration 108 may specify a number of instances of the application 114 executing within the computing environment and the execution metrics 120 may specify, e.g., a number of requests received by the application 114 and latency in responding to the requests by the application 114. The reference configuration 130 identified by the classifier model 126 may include a similar number of instances and the associated reference execution metrics 134 may include similar numbers of requests and a similar latency in responding. Additionally, as discussed above in connection with the configuration 200, the configuration 108 may specify system-level configurations 204 and required system resources 208 and the reference configuration 130 may include similar system-level conditions and/or required system resources to those specified in the configuration 108.

A configuration correction may be identified based on the particular reference configuration (block 508). For example, the operator service 106 may identify a configuration correction 146 based on the reference configuration 130 identified at block 506. The configuration correction 146 may specify one or more changes to the configuration 108. For example, the reference configuration 130 that corresponds to the configuration 108 may represent an erroneous configuration that needs to be corrected (e.g., that utilizes excessive system resources and/or does not meet performance requirements). Therefore, because the configuration 108 corresponds to such an erroneous configuration 130, the configuration 108 may similarly require correction to ensure proper operation and execution of the application 114. The configuration correction 146 may accordingly be identified to correct the configuration 108 and to enable proper execution of the application 114. For example, the identified reference configuration 130 may also correspond to a corrected configuration 138 within the knowledge base 128. The configuration correction 146 may be generated based on the corrected configuration 138. For example, the configuration 108 may indicate that a single instance of the application 114 is executing to service API requests and that the single instance of the application 114 is allocated 1 Mb/s of bandwidth. The execution metrics 120 may indicate that the application 114 is servicing 100 requests per second and has a response latency of 75 ms. The reference configuration 130 may indicate that a single instance of the application is executing as well and that the single instance of the application is allocated 1.2 Mb/s of bandwidth. The reference execution metrics 134 may indicate that the application is servicing 90 requests per second and has a response latency of 70 ms. The corrected configuration 138, however, may indicate that the application has three instances that are executing and that each instance has 0.7 Mb/s of bandwidth allocated (for a total of 2.1 Mb/s of bandwidth for the application). In certain implementations, the corrected configuration 138 may also include associated execution metrics indicating improved performance (e.g., 90 requests per second received at a response latency of 10 ms). Based on the corrected configuration 138, the configuration correction 146 may be identified to include increasing the number of instances of the application 114. Additionally alternatively the configuration correction 146 may be identified to include reducing the bandwidth to each instance of the application 114. In certain implementations, the configuration correction 148 may be generated to apply all or part of the corrected configuration 138 (e.g., implementation details 206 of the corrected configuration 138) to the configuration 108. Additionally or alternatively, the configuration correction 146 may then be presented (e.g., by presenting an alert, storing the configuration correction 146 in a particular directory) and may subsequently be utilized to update the configuration.

By performing the method 500, the computing environment 100 may be able to improve the performance of applications that are executing with erroneous configurations. In particular, where applications are executing below an expected performance threshold, the configurations of the applications may be analyzed by the operator service according to the method 500 in order to restore proper performance of the applications. Further, the knowledge base 128 may be assembled from example configurations and corrections processed by systems and technicians, ensuring a reliable and consistent source of examples for use by the classifier model 126 without having to generate specialized training and/or correction examples for the knowledge base 128. Additionally, the classifications and corrections made by the operator service 106 may be customized for different deployments. For example, in certain implementations, the knowledge base 128 may store reference configurations, reference execution metrics, and corrected configurations associated with a specialized computing application and/or environment. Therefore, the corresponding configurations identified by the classifier model 126 in the resulting configuration corrections 146 may be customized based on the examples included within the knowledge base 128.

Further, the operator service 106 and the classifier model 126 may be capable of executing entirely within the computing environment 100 and without transferring data (e.g., data regarding the configuration 108, the application 114, and/or the execution metrics 120). Such contained analysis may protect the confidentiality of sensitive applications and/or information and may assist in complying with privacy regulations, such as the European General Data Protection Regulation (GDPR).

Figure 6:
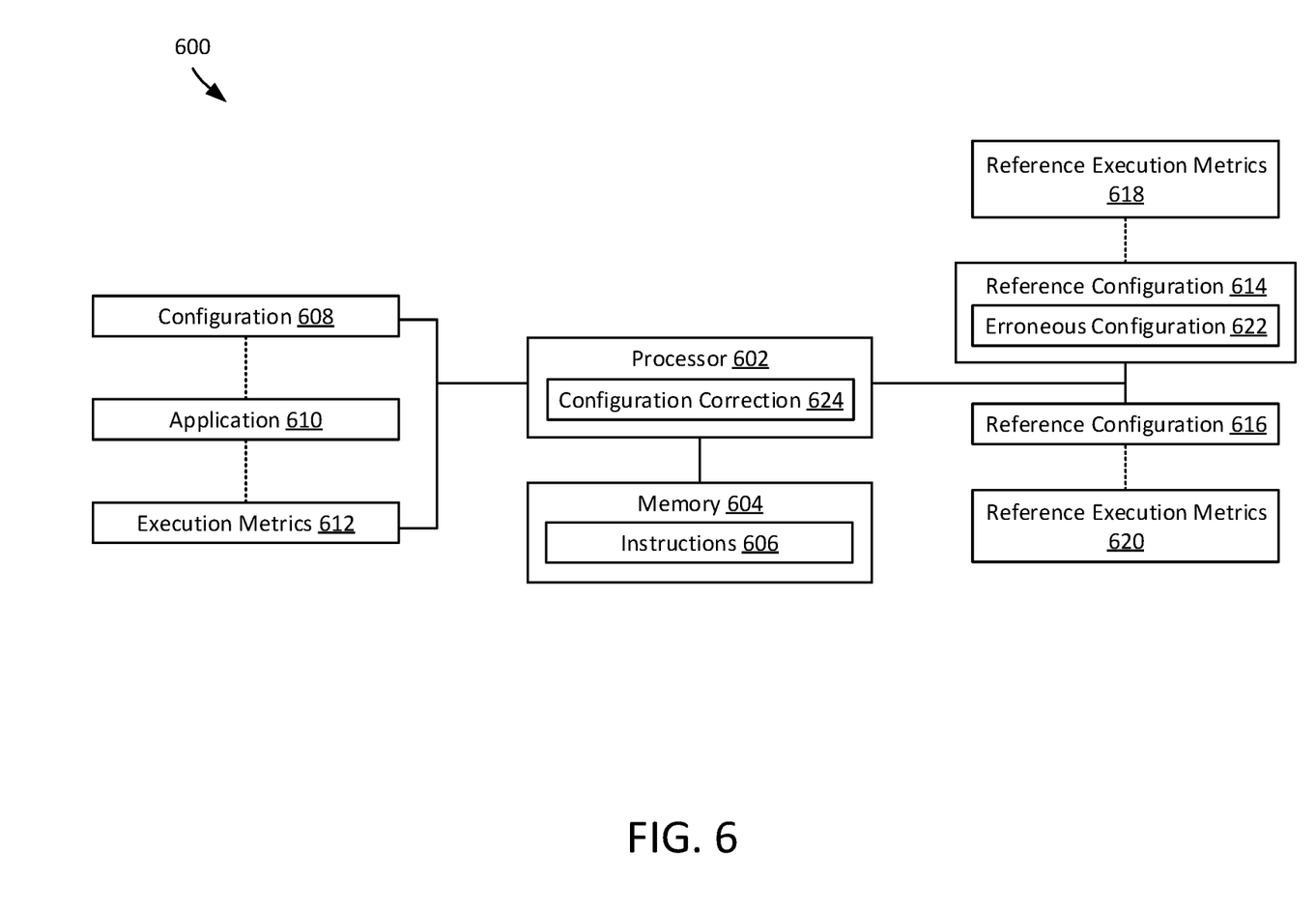
FIG. 6 illustrates a system according to an exemplary embodiment of the present disclosure.

FIG. 6 illustrates a system 600 according to an exemplary embodiment of the present disclosure. The system 600 may include a processor 602 and a memory 604. The memory 604 may store instructions 606 which, when executed by the processor 602, cause the processor to receive (i) a configuration 608 corresponding to an application 610 and (ii) execution metrics 612 corresponding to the application 610. The configuration 608 and the execution metrics 612 may be compared to a plurality of reference configurations 614, 616 and a plurality of reference execution metrics 618, 620 associated with the plurality of reference configurations 614, 616. A particular reference configuration 614 from among the plurality of reference configurations 614, 616 may be identified that corresponds to the configuration 608. The particular reference configuration 614 may represent an erroneous configuration 622 to be corrected. A configuration correction 624 may be identified based on the particular reference configuration 614.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving (i) a configuration corresponding to an application and (ii) execution metrics corresponding to the application;
comparing the configuration and the execution metrics to a plurality of reference configurations and a plurality of reference execution metrics associated with the plurality of reference configurations;
identifying, using a classifier model, a particular reference configuration from among the plurality of reference configurations that corresponds to the configuration, wherein the particular reference configuration represents an erroneous configuration to be corrected; and
identifying a configuration correction based on the particular reference configuration,
wherein the classifier model is trained based on at least a subset of the plurality of reference configurations and at least a subset of the plurality of reference execution metrics.

2. The method of claim 1, wherein at least one of (i) the particular reference configuration is similar to the configuration and (ii) the particular reference configuration is associated with particular execution metrics that are similar to the execution metrics.

3. The method of claim 1, wherein identifying the configuration correction comprises:
identifying a corrected configuration associated with the particular reference configuration; and
generating the configuration correction based on a difference between the configuration and the corrected configuration.

4. The method of claim 1, wherein the execution metrics include at least one of a latency of the application, a throughput of the application, a processor utilization of the application, a memory utilization of the application, and a storage utilization of the application.

5. The method of claim 1, wherein the configuration is received from an application programming interface service of a computing environment executing the application, the application programming interface service being configured to generate and apply configurations to applications executing within the computing environment.

6. The method of claim 1, wherein the configuration includes both an application-level configuration specifying at least one of (i) application-specific implementation details and (ii) system resources required for execution.

7. The method of claim 1, wherein the application is executed by a cluster of a computing environment, and wherein the method is performed by the cluster without transmitting the configuration or the execution metrics from the cluster.

8. The method of claim 4, wherein the application is executing within a computing environment and the execution metrics are received from a metrics service of the computing environment.

9. The method of claim 6, wherein the configuration further includes a system-level configuration specifying an amount of one or more system resources available for execution of the application.

10. The method of claim 9, wherein identifying the particular reference configuration includes comparing both the application-level configuration and the system-level configuration to the plurality of reference configurations.

11. A system comprising:
a processor; and
a memory storing instructions which, when executed by the processor, cause the processor to:
receive (i) a configuration corresponding to an application and (ii) execution metrics corresponding to the application;
compare the configuration and the execution metrics to a plurality of reference configurations and a plurality of reference execution metrics associated with the plurality of reference configurations;
identify, using a classifier model, a particular reference configuration from among the plurality of reference configurations that corresponds to the configuration, wherein the particular reference configuration represents an erroneous configuration to be corrected; and
identify a configuration correction based on the particular reference configuration,
wherein the classifier model is trained based on at least a subset of the plurality of reference configurations and at least a subset of the plurality of reference execution metrics.

12. The system of claim 11, wherein at least one of (i) the particular reference configuration is similar to the configuration and (ii) the particular reference configuration is associated with particular execution metrics that are similar to the execution metrics.

13. The system of claim 11, wherein the memory stores further instructions which, when executed by the processor while identifying the configuration correction, cause the processor to:
identify a corrected configuration associated with the particular reference configuration; and
generate the configuration correction based on a difference between the configuration and the corrected configuration.

14. The system of claim 11, wherein the configuration is received from an application programming interface service of a computing environment executing the application, the application programming interface service being configured to generate and apply configurations to applications executing within the computing environment.

15. The system of claim 11, wherein the configuration includes both an application-level configuration specifying at least one of (i) application-specific implementation details and (ii) system resources required for execution.

16. The system of claim 11, wherein the application is executed by a cluster of a computing environment, and wherein the particular reference configuration is identified by the cluster without transmitting the configuration or the execution metrics from the cluster.

17. The system of claim 15, wherein the configuration further includes a system-level configuration specifying an amount of one or more system resources available for execution of the application.

18. The system of claim 17, wherein identifying the particular reference configuration includes comparing both the application-level configuration and the system-level configuration to the plurality of reference configurations.

19. A non-transitory, computer-readable medium storing instructions which, when executed by a processor, cause the processor to:
receive (i) a configuration corresponding to an application and (ii) execution metrics corresponding to the application;
compare the configuration and the execution metrics to a plurality of reference configurations and a plurality of reference execution metrics associated with the plurality of reference configurations;
identify, using a classifier model, a particular reference configuration from among the plurality of reference configurations that corresponds to the configuration, wherein the particular reference configuration represents an erroneous configuration to be corrected; and
identify a configuration correction based on the particular reference configuration,
wherein the classifier model is trained based on at least a subset of the plurality of reference configurations and at least a subset of the plurality of reference execution metrics.

* * * * *